(12) United States Patent
Cirillo et al.

(10) Patent No.: US 11,489,599 B1
(45) Date of Patent: Nov. 1, 2022

(54) WIDEBAND FREQUENCY RESPONSE CHARACTERIZATION WITH A NARROWBAND SOURCE OR RECEIVER

(71) Applicant: Rohde & Schwarz GmbH & Co. KG, Munich (DE)

(72) Inventors: Luke Cirillo, Poing (DE); Alexander Breitenfeld, Markt Schwaben (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 17/365,728

(22) Filed: Jul. 1, 2021

(51) Int. Cl.
| H04B 17/21 | (2015.01) |
| H04B 17/23 | (2015.01) |
| H04B 17/18 | (2015.01) |
| H04L 25/03 | (2006.01) |

(52) U.S. Cl.
CPC ............ *H04B 17/21* (2015.01); *H04B 17/18* (2015.01); *H04B 17/23* (2015.01); *H04L 25/03159* (2013.01)

(58) Field of Classification Search
CPC ........ H04B 17/21; H04B 17/18; H04B 17/23; H04L 25/03159
See application file for complete search history.

(56) References Cited

U.S. PATENT DOCUMENTS

| 5,521,943 | A | * | 5/1996 | Dambacher | ............ | H04H 20/95 |
| | | | | | | 375/295 |
| 6,091,940 | A | * | 7/2000 | Sorrells | .................... | H03C 1/62 |
| | | | | | | 375/350 |
| 6,542,722 | B1 | * | 4/2003 | Sorrells | .................... | H03D 7/00 |
| | | | | | | 455/113 |
| 6,931,373 | B1 | * | 8/2005 | Bhaskar | .................. | G10L 19/08 |
| | | | | | | 704/219 |
| 9,362,934 | B2 | * | 6/2016 | Kahmen | .................. | H03M 1/70 |
| 9,544,070 | B2 | * | 1/2017 | Bratfisch | .............. | H04B 17/318 |
| 9,634,695 | B1 | * | 4/2017 | Subrahmaniyan Radhakrishnan | ......... | H03F 3/24 |
| 9,810,716 | B2 | * | 11/2017 | Cirillo | .................. | G01R 13/029 |
| 9,851,383 | B1 | * | 12/2017 | Barich | .................... | G01R 23/02 |
| 10,088,554 | B2 | * | 10/2018 | Cirillo | ..................... | G01R 23/20 |
| 10,382,160 | B2 | * | 8/2019 | Kiihne | ................... | H04B 1/715 |
| 10,547,490 | B1 | * | 1/2020 | Lagler | ................. | H04L 27/3863 |
| 10,567,093 | B1 | * | 2/2020 | Buchwald | .......... | G01R 29/0878 |

(Continued)

*Primary Examiner* — James M Perez
(74) *Attorney, Agent, or Firm* — Ditthavong, Steiner & Mlotkowski

(57) ABSTRACT

The present disclosure relates to a method (10) for characterizing a wideband RF device-under-test (DUT) by means of a narrowband RF source or a narrowband RF receiver, the method (10) comprising: selecting (11) a bandwidth of the wideband RF DUT to be analyzed; dividing (12) the selected bandwidth into at least two overlapping sub-bands, the respective sub-bands having a frequency range that corresponds to a bandwidth of the narrowband RF source or the narrowband RF receiver; acquiring (13) a response of the wideband RF DUT for each of the at least two overlapping sub-bands by means of at least two narrowband measurements using the narrowband RF source or the narrowband RF receiver; and calculating (14) a continuous amplitude response and a continuous phase response of the wideband RF DUT in a frequency range that corresponds to the combined bandwidth of the at least two overlapping sub-bands, said calculation making use of the overlap of the sub-bands.

15 Claims, 7 Drawing Sheets

(56) References Cited

U.S. PATENT DOCUMENTS

| | | | |
|---|---|---|---|
| 10,585,120 B2* | 3/2020 | Cirillo | G01R 23/18 |
| 10,862,516 B1* | 12/2020 | Chiang | H03F 3/189 |
| 11,075,786 B1* | 7/2021 | Shattil | H04L 5/0007 |
| 11,346,869 B2* | 5/2022 | Schoeller | G01R 35/005 |
| 2004/0116083 A1* | 6/2004 | Suzuki | H03F 1/3258 |
| | | | 330/149 |
| 2005/0175111 A1* | 8/2005 | Dhaene | G06F 30/367 |
| | | | 375/259 |
| 2009/0092177 A1* | 4/2009 | Dvorak | H04B 17/101 |
| | | | 375/224 |
| 2012/0161749 A1* | 6/2012 | Sternberg | H04B 17/101 |
| | | | 324/76.23 |
| 2013/0064325 A1* | 3/2013 | Kilambi | H03F 1/3241 |
| | | | 375/297 |
| 2013/0141160 A1* | 6/2013 | Ohkawara | H03F 3/189 |
| | | | 330/149 |
| 2013/0243121 A1* | 9/2013 | Bai | H03F 1/3247 |
| | | | 375/297 |
| 2013/0346005 A1* | 12/2013 | Cirillo | G01R 23/18 |
| | | | 702/67 |
| 2014/0347126 A1* | 11/2014 | Laporte | H03F 1/34 |
| | | | 330/149 |
| 2014/0347132 A1* | 11/2014 | Kawasaki | H03F 3/24 |
| | | | 330/291 |
| 2016/0084940 A1* | 3/2016 | Cirillo | G01R 23/20 |
| | | | 342/21 |
| 2018/0059142 A1* | 3/2018 | Cirillo | G01R 13/0236 |
| 2020/0028476 A1* | 1/2020 | Kim | H04B 1/0475 |
| 2020/0382147 A1* | 12/2020 | Menkhoff | H03F 3/195 |
| 2021/0215789 A1* | 7/2021 | Hu | G01S 13/003 |
| 2021/0234547 A1* | 7/2021 | van den Heuvel | H03L 7/10 |
| 2021/0275056 A1* | 9/2021 | Mcmahon | A61B 5/1126 |
| 2022/0045774 A1* | 2/2022 | Steffens | H04B 17/391 |
| 2022/0128608 A1* | 4/2022 | Schoeller | G01R 35/005 |

* cited by examiner (a) signal (b) channel of analyzer (c) measured signal

WIDEBAND FREQUENCY RESPONSE CHARACTERIZATION WITH A NARROWBAND SOURCE OR RECEIVER

TECHNICAL FIELD

The present disclosure relates to a method for characterizing a wideband RF device-under-test (DUT) by means of a narrowband RF source or a narrowband RF receiver. The present disclosure further relates to a system for characterizing a wideband RF receiver as well as a system for characterizing a wideband RF source.

BACKGROUND ART

Wideband radio frequency (RF) receivers, such as spectrum analyzers, should measure an RF spectrum over a wide bandwidth as accurately as possible. However, the hardware of a RF receiver can influence the measured spectrum to some degree. Therefore, it is important to know and consider the exact frequency response of a wideband RF receiver to perform accurate measurements. The same is true for wideband RF signal sources, which can also influence a generated signal by their hardware in an unwanted way.

It is therefore important to characterize the frequency response of such wideband RF devices over their entire bandwidth, for example for a calibration of the devices. In particular, it is important to know both the amplitude and the phase response of the wideband RF devices over the entire bandwidth.

Known solutions to characterize a frequency response of an RF device include the use of a power sensor, or a classical channel estimation. However, a power sensor may only characterize the amplitude but not the phase response of the wideband RF device. To perform a classical channel estimation, a reference source or receiver with the same bandwidth as the wideband RF device is required.

However, often only reference sources or receivers with a lower bandwidth than that of the wideband RF devices are available. Trying to compensate for the lower bandwidth of the reference sources or receivers by making multiple measurements may lead to problems coming from the measurement setup. For example, multiple measurements at different frequencies cannot be combined easily, because a phase offset between a wideband RF device and the reference receiver or signal source varies for each measurement.

The document U.S. Pat. No. 9,851,383 B1 discloses a method for performing vector spectral measurements of a radio frequency signal having a repetitive waveform, using a receiver having a frequency span less than a total bandwidth of the RF signal. The method includes capturing multiple frequency segments of the RF signal corresponding to waveforms of the repetitive waveform synchronized to corresponding external triggering, and performing at least one instance of phase stitching and at least one instance of amplitude stitching between adjacent captured frequency segments.

SUMMARY

Thus, it is an objective to provide an improved method for characterizing a wideband RF DUT by means of a narrowband RF source or a narrowband RF receiver, an improved system for characterizing a wideband RF receiver as well as an improved system for characterizing a wideband RF source. In particular, the above-mentioned disadvantages should be avoided.

The objective is achieved by the embodiments provided in the enclosed independent claims. Advantageous implementations of the embodiments of the present disclosure are further defined in the dependent claims.

According to a first aspect, the present disclosure relates to method for characterizing a wideband radio frequency device-under-test (RF DUT) by means of a narrowband RF source or a narrowband RF receiver, the method comprising:
  selecting a bandwidth of the wideband RF DUT to be analyzed;
  dividing the selected bandwidth into at least two overlapping sub-bands, the respective sub-bands having a frequency range that corresponds to a bandwidth of the narrowband RF source or the narrowband RF receiver;
  acquiring a response of the wideband RF DUT for each of the at least two overlapping sub-bands by means of at least two narrowband measurements using the narrowband RF source or the narrowband RF receiver; and
  calculating a continuous amplitude response and a continuous phase response of the wideband RF DUT in a frequency range that corresponds to the combined bandwidth of the at least two overlapping sub-bands, said calculation making use of the overlap of the sub-bands.

This achieves the advantage that both a phase response and an amplitude response of a RF DUT over a wide bandwidth can be characterized efficiently using a reference RF source or receiver with a lower bandwidth. In particular, the phase and amplitude response can be carried out by a single-port measurement and without the need for phase coherency between the reference source or receiver and the RF DUT. Furthermore, no repetitive signal from the wideband RF DUT or the narrowband RF source is required to perform the characterization.

The method may be used to reconstruct a composite complex frequency response of a channel transfer function of the RF DUT, said composite complex frequency response encompassing the amplitude response and the phase response of the DUT over its entire operation bandwidth. In other words, the method re-constructs a "wideband" frequency response from multiple narrowband (sub-band) measurements. The amplitude and phase response of the wideband RF DUT may represent or contain the influence of the DUT on a signal generated or recorded by the DUT due to its inherent properties, in particular the influence of the DUT on the amplitude and/or phase of said signal. This complex frequency response can, thus, be used to calibrate the wideband RF DUT or a system that uses the wideband RF DUT. In particular, the method can also be used to reconstruct multiple combined transfer functions, e.g. RF, baseband generator and baseband analyzer.

The bandwidth to be analyzed may correspond to the entire available bandwidth of the wideband RF DUT or a section thereof. In particular, the at least two overlapping sub-bands have different center frequencies within the bandwidth to be analyzed. The bandwidth of the narrowband RF source or the narrowband RF receiver may correspond to any bandwidth these devices are capable to operate at, e.g. the fully available bandwidth of these devices or a narrower set bandwidth.

The at least two overlapping sub-bands may comprise a plurality of sub-bands, wherein each of this plurality of sub-bands overlaps with its directly adjacent sub-band(s). For instance, each sub-band overlaps at most with one sub-band on each side, i.e. one sub-band on its higher and one sub-band on its lower frequency side.

In an embodiment, the at least two narrowband measurements using the narrowband RF source or the narrowband RF receiver comprise:
forwarding at least two RF signals from the narrowband RF source to the wideband RF DUT; or
acquiring at least two signal-sections of an RF signal produced by the wideband RF DUT by means of the narrowband RF receiver.

For example, the narrowband RF source has baseband I/Q modulation capabilities or analog and phase modulation capabilities. The narrowband RF source might comprise a configurable RF mixer to place the baseband signal at desired center frequencies within the wideband frequency range to be characterized. Likewise, the narrowband RF receiver might have I/Q demodulation capability at desired center frequencies within the wideband frequency range to be characterized.

In an embodiment, the wideband RF DUT is any one of: a wideband RF receiver, a wideband RF transmitter, a wideband RF transceiver, or a wideband RF source. For example, the wideband RF DUT can be a signal generator, a signal analyzer, a spectrum analyzer, or an oscilloscope.

In an embodiment, the response of the wideband RF DUT for each of the at least two overlapping sub-bands is acquired subsequently and stored in a memory.

In particular, said acquired response of the RF DUT for each sub-band comprises the phase response and the amplitude response of the RF DUT for each sub-band. The continuous phase and the continuous amplitude response can then be calculated separately taking into account the phase respectively frequency responses for each sub-band.

The frequency range that corresponds to the combined bandwidth of the at least two overlapping sub-bands may cover the entire selected bandwidth of the wideband RF DUT to be analyzed. This selected bandwidth can be the entire usable bandwidth of the wideband RF DUT.

In an embodiment, when calculating the continuous amplitude response and the continuous phase response of the wideband RF DUT, contributions from at least two of an RF source baseband, an RF receiver baseband, or a common RF path are neglected.

In an embodiment, the method further comprises:
determining a statistical deviation of the continuous amplitude response and/or the continuous phase response.

In an embodiment, the calculation of the continuous amplitude response and the continuous phase response of the wideband RF DUT comprises an FFT (fast Fourier transform) operation.

In an embodiment, the method further comprises:
calibrating the wideband RF DUT based on the calculated continuous amplitude response and/or the calculated continuous phase response.

In an embodiment, the step of calibrating the wideband RF DUT comprises adjusting an equalizer and/or a predistortion filter based on the calculated continuous amplitude response and/or the calculated continuous phase response.

According to a second aspect, the present disclosure relates to a system for characterizing a wideband RF receiver, comprising: a narrowband RF source having a lower bandwidth than the wideband RF receiver; the narrowband RF source being configured to forward at least two RF signals to the wideband RF receiver, the at least two RF signals having partially overlapping bandwidths within the bandwidth of the wideband RF receiver; and a processor being configured to analyze a response of the wideband RF receiver to the at least two RF signals; the processor being configured to calculate a continuous amplitude response and a continuous phase response of the wideband RF receiver in a frequency range that corresponds to the combined bandwidths of the at least to RF signals, said calculation making use of the overlap of the bandwidths of the at least two RF signals.

In particular, the at least two RF signals have different center frequencies within the bandwidth of the wideband RF receiver.

In an embodiment, the system further comprises user interface for selecting the bandwidth of the wideband RF receiver to be analyzed.

In an embodiment, the system further comprises a memory, wherein the processor is configured to store the response of the wideband RF receiver to the at least two RF signals in the memory.

According to a third aspect, the present disclosure relates to a system for characterizing a wideband RF source, comprising: a narrowband RF receiver having a lower bandwidth than the wideband RF source; the narrowband RF receiver being configured to acquire at least two signal-sections of an RF signal produced by the wideband RF source, the at least two signal-sections of the RF signal having partially overlapping bandwidths within the bandwidth of the RF signal; and a processor being configured to analyze a response of the narrowband RF receiver to the at least two signal-sections of the RF signal; the processor being configured to calculate a continuous amplitude response and a continuous phase response of the wideband RF source in a frequency range that corresponds to the combined bandwidths of the at least two signal-sections of the RF signal, said calculation making use of the overlap of the bandwidths of the at least two signal-sections of the RF signal.

In particular, the at least two signal-sections of the RF signal have different center frequencies within the bandwidth of the wideband RF source.

In an embodiment, the system comprises a user interface for selecting the bandwidth of the wideband RF source to be analyzed.

In an embodiment, the system comprises a memory, wherein the processor is configured to store the response of the narrowband RF receiver to the at least two signal-sections of the RF signal in the memory.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
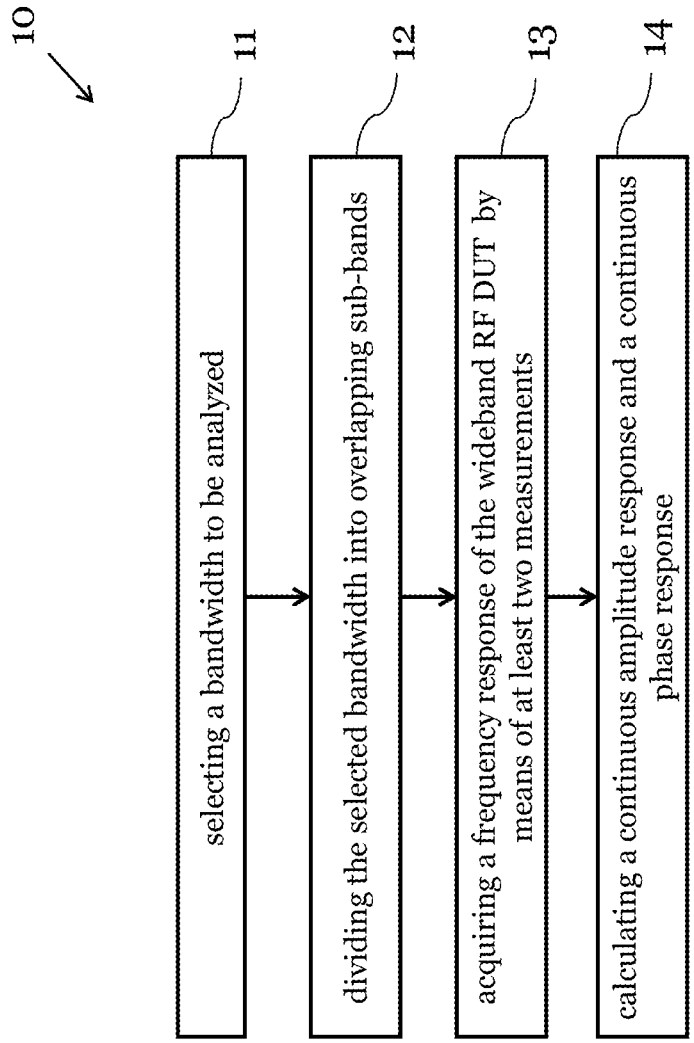
FIG. 1 shows a flow diagram of a method for characterizing a wideband RF DUT by means of a narrowband RF source or narrowband RF receiver according to an embodiment.

FIG. 1 shows a flow diagram of a method 10 for characterizing a wideband RF DUT by means of a narrowband RF source or narrowband RF receiver according to an embodiment.

The method 10 comprises the steps of:
selecting 11 a bandwidth of the wideband RF DUT to be analyzed;
dividing 12 the selected bandwidth into at least two overlapping sub-bands, the respective sub-bands having a frequency range that corresponds to bandwidths of the narrowband RF source or the narrowband RF receiver;
acquiring 13 a response of the wideband RF DUT for each of the at least two overlapping sub-bands by means of at least two narrowband measurements using the narrowband RF source or the narrowband RF receiver; and
calculating 14 a continuous amplitude response and a continuous phase response of the wideband RF DUT in a frequency range that corresponds to the combined bandwidth of the at least two overlapping sub-bands, said calculation making use of the overlap of the sub-bands.

The method 10 can be used to reconstruct a composite complex frequency response of a channel transfer function of the wideband RF DUT. This composite complex frequency response encompasses the continuous amplitude response and/or the continuous phase response of the wideband RF DUT. In other words, the method 10 re-constructs a single continuous "wideband" frequency response, particularly its amplitude and phase components, from multiple narrowband (sub-band) measurements.

The selected bandwidth can be divided 12 into the sub-bands by a controller or processor that receives the selection 11 and controls the narrowband RF source or the narrowband RF receiver. The sub-bands can be chosen such that their frequency range coincides with an available frequency range of the narrowband RF receiver or source.

In particular, the at least two overlapping sub-bands have different center frequencies within the bandwidth to be analyzed and cover different frequency ranges. The selected bandwidth to be analyzed may correspond to the entire available operation bandwidth of the wideband RF DUT or of a section thereof. The selected bandwidth can be divided 12 into the overlapping sub-bands based on a lower modulation bandwidth of the narrowband RF source or the narrowband RF receiver.

In particular, the term narrowband measurement refers to a measurement over the frequency range of the narrowband RF receiver or source.

The acquired response of the DUT for each sub-band may refer to a quantitative measure of the output spectrum (amplitude and/or phase) of the wideband DUT as recorded during the individual measurements with the narrowband RF source or the narrowband RF receiver. Said output spectrum can be subsequently analyzed, e.g. compared to a known spectrum from the narrowband RF source, in order to calculate the amplitude and phase response. The acquired response of the DUT may comprise an amplitude response and a phase response for each of the at least two sub-bands.

The calculated continuous amplitude response and continuous phase response of the wideband RF DUT may represent an influence of the DUT on a signal that is generated or recorded by the wideband RF DUT over the selected bandwidth, said influence being at least partially caused due to inherent properties of the DUT. For example, the amplitude and phase response may represent or contain a "fingerprint" that is imposed by the DUT on a generated or recorded RF signal.

The amplitude/phase response, in particular this "fingerprint", can be analyzed and/or used to calibrate the wideband RF DUT or a system that uses the wideband RF DUT. Normally, a wideband calibration signal generator or receiver would be required to calibrate a wideband RF DUT over its entire bandwidth. However, with this method 10, a wideband calibration can be carried out with narrowband calibration signal generators or receivers.

In the step of calculating 14 the continuous amplitude response and the continuous phase response of the wideband RF DUT, the overlap of the sub-bands can be exploited in different ways. For example, a deviation between the phases and/or the amplitudes of the frequency responses in the overlapping parts of the sub-bands can be considered and canceled out, resulting in a continuous complex frequency response (continuous amplitude response and continuous phase response) over the frequency range of both sub-bands. Thereby, any frequency or phase deviations between the individual narrowband measurements resulting from the wideband RF DUT itself, e.g. due to its inherent properties, or from the measurement equipment, e.g. from a generator oscillator, can be canceled out.

In particular, since the transfer function of the wideband RF DUT includes a linear phase error due to a changing trigger and phase offset between DUT and narrowband RF source or receiver, the transfer function changes in each narrowband measurement. Hence, the calculation adjusts the linear part of the phase for each narrowband measurement at different center frequency to generate the continuous phase response.

The calculation 14 of the continuous amplitude response and the continuous phase response of the wideband RF DUT may comprise an FFT (fast Fourier transform) operation. In particular, an amplitude stitching and/or a phase stitching operation can be carried out to generate the continuous frequency response, said amplitude stitching and/or a phase stitching taking into account differences between the amplitude/phase responses in the overlapping portions of the sub-bands.

In particular, the algorithm that is carried out during the calculation 14 separates frequency response contributions from at least two of: a signal source baseband, a receiver baseband, and/or a common RF path (i.e. up-mixing at source and down-mixing at receiver). For example, the algorithm assumes that these two parts do not change, and the frequency is shifted in-between.

The algorithm can reconstruct the amplitude and phase response of the wideband RF DUT over the entire measured frequency range, i.e. reconstruct of a "wideband" frequency response from multiple narrowband (sub-band) measurements. The resulting reconstructed frequency response from a plurality of narrowband measurements is equivalent to the result of a single wideband measurement where the RF source or receiver cover the entire bandwidth of the wideband RF device. In particular, the algorithm can provide the response for the RF path while also providing an estimate of the separate source and receiver baseband frequency responses.

In particular, the continuous amplitude response and the continuous phase response are calculated separately.

The calculation of the continuous amplitude and/or phase response can at least partially be based on solving a maximum likelihood estimate. For example, a channel vector which contains the channel from an offset in the sub-band measurements can be decomposed into linear equations, one for the amplitude in logarithmic domain and one for the phase. The calculation of the continuous amplitude response can at least partially be based on an eigenvalue decomposition of the amplitude equation system. Likewise, the calculation of the continuous phase response can at least partially be based on another eigenvalue decomposition of the phase equation system. Thereby, the overlap of the sub-bands is exploited. However, alternative estimation methods other than a maximum likelihood estimate or an eigenvalue decomposition may also be used.

The wideband RF DUT can be any one of or may comprise any one of: a wideband RF receiver, a wideband RF transmitter, a wideband RF transceiver, or a wideband RF source. For example, the wideband RF DUT can be a signal generator, a signal analyzer, a spectrum analyzer, or an oscilloscope.

A user can select 11 the bandwidth of the wideband RF DUT to be analyzed on a user interface.

Figure 2:
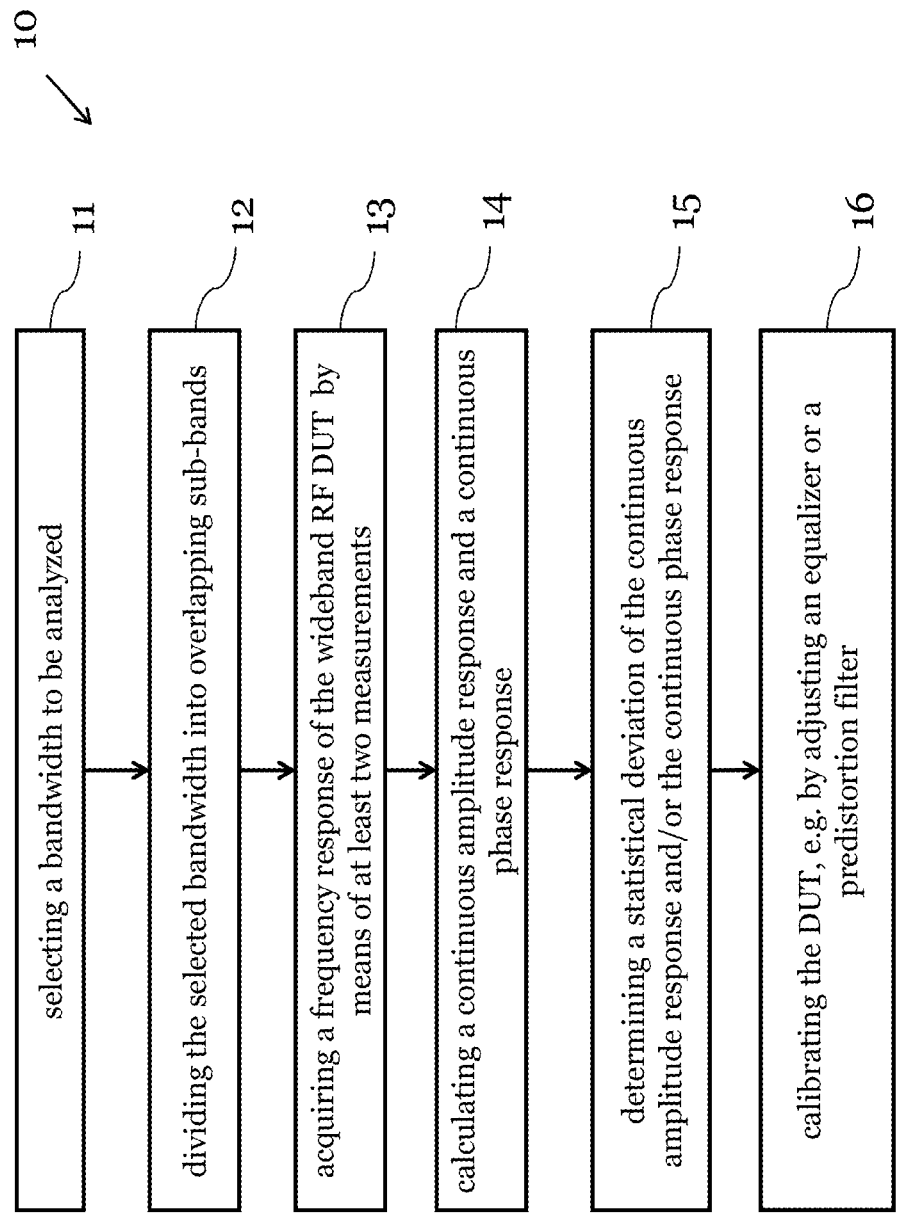
FIG. 2 shows a flow diagram of a method for characterizing a wideband RF DUT by means of a narrowband RF source or narrowband RF receiver according to an embodiment.

FIG. 2 shows a flow diagram of the method 10 for characterizing the wideband RF DUT according to another embodiment.

In contrast to the embodiment shown in FIG. 1, the method 10 shown in FIG. 2 comprises the additional steps of:
  determining 15 a statistical deviation of the continuous amplitude response and/or the continuous phase response; and/or
  calibrating 16 the wideband RF DUT based on the calculated continuous amplitude response and continuous phase response.

The algorithm that is carried out in order to calculate 14 the continuous amplitude and phase response may also provide the statistical deviation, i.e. a statistical measure of accuracy of the reconstructed continuous amplitude and/or phase response.

The calibration 16 may comprise an equalization of the wideband DUT device, e.g., via calculation of an inverse frequency response and filtering operation of signal source or receiver. In particular, the calibration 16 may comprise an adjusting of an equalizer or of a predistortion filter.

The equalizer or the predistortion filter may be associated with the wideband RF DUT or comprised by the wideband RF DUT. For example, the calibration 16 may comprise performing an equalization or predistortion of a wideband RF signal source or receiver via calculation of an inverse frequency response and filtering operation. In particular, an equalization or predistortion filter set can thereby be adapted based on a center frequency of the narrowband source or receiver.

Figure 3:
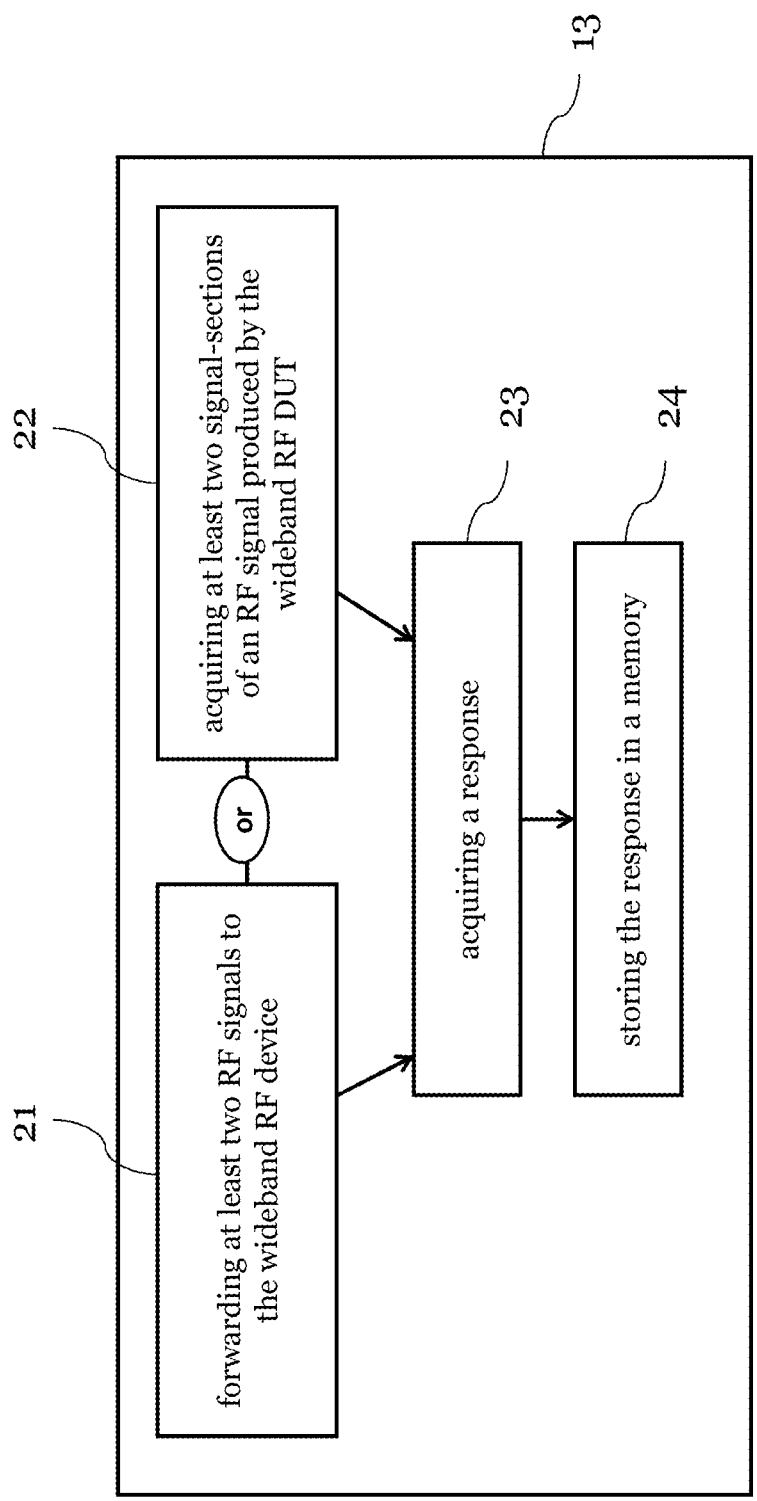
FIG. 3 shows a flow diagram of a step of the method of FIG. 1 or FIG. 2 according to an embodiment.

FIG. 3 shows a flow diagram of further sub-steps of step 13 of the method 10 of FIG. 1 or FIG. 2 according to an embodiment.

As shown in FIG. 3, the response of the wideband RF DUT in the frequency range of the at least two overlapping sub-bands can be acquired 23 by any one of the following two narrowband measurements:
  forwarding 21 at least two RF signals from the narrowband RF source to the wideband RF DUT; or
  acquiring 22 at least two signal-sections of an RF signal produced by the wideband RF DUT by means of the narrowband RF receiver.

For example, step 21 can be carried out, if the wideband RF DUT is a wideband RF source, and step 22 can be carried out, if the wideband RF DUT is a wideband RF receiver. In particular, the at least two RF signals are forwarded 21 subsequently to the wideband RF DUT. Likewise, the at least two signal-sections can be acquired 22 subsequently by the wideband RF DUT.

In a subsequent sub-step 24, the acquired response can be stored in a memory.

Figure 4:
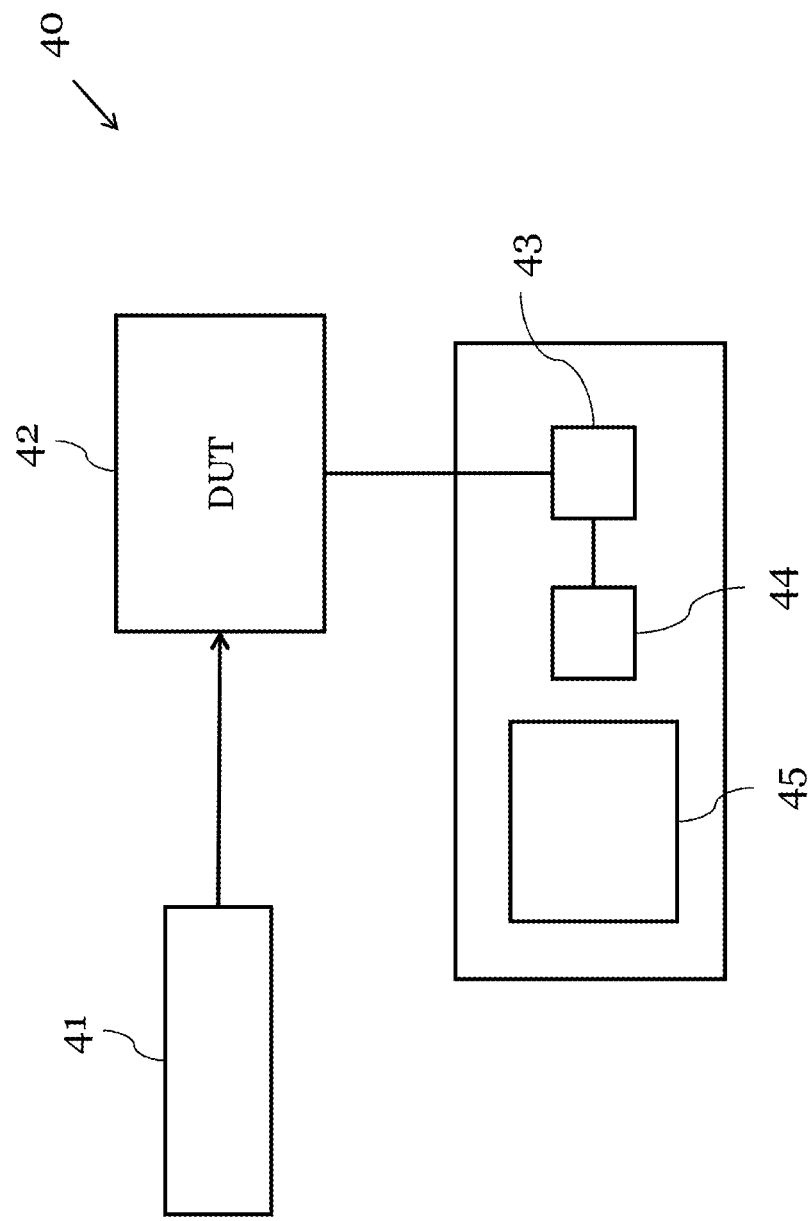
FIG. 4 shows a schematic diagram of a system for characterizing a wideband RF receiver according to an embodiment.

FIG. 4 shows a schematic diagram of a system 40 for characterizing a wideband RF receiver 42 according to an embodiment.

The system 40 comprises a narrowband RF source 41 having a lower bandwidth than the wideband RF receiver 42, wherein the narrowband RF source 41 is configured to forward at least two RF signals to the wideband RF receiver 42, wherein the at least two RF signals have partially overlapping bandwidths within the bandwidth of the wideband RF receiver. The system 10 further comprises a processor 43, which is configured to analyze a response of the wideband RF receiver 42 to the at least two RF signals. The processor 43 is further configured to calculate a continuous amplitude response and a continuous phase response of the wideband RF receiver 42 in a frequency range that corresponds to the combined bandwidths of the at least to RF signals, wherein said calculation making use of the overlap of the bandwidths of the at least two RF signals.

In particular, the wideband RF receiver 42 can be a DUT which is characterized by the system 40. Based on this characterization, the wideband RF receiver 42 can be calibrated. For example, an equalization of the wideband RF receiver 42 can be carried out based on the calculated continuous amplitude response and continuous phase, e.g. via calculation of an inverse frequency response and filtering operation.

The wideband RF receiver 42 may comprise an equalizer filter and/or a predistortion filter. These filters can be adjusted based on the calculated continuous amplitude response and continuous phase response of the wideband RF receiver 42, for instance during such a calibration of the receiver 42.

The narrowband RF source 41 can have baseband I/Q modulation capabilities, or analog and phase modulation capabilities. The narrowband RF source 41 can comprise a configurable RF mixer to place the baseband signal at desired center frequency with the wideband frequency range to be characterized.

The system 40 can further comprise a user interface 45 and/or a memory 44. A user can, for example, select the bandwidth of the wideband RF receiver to be analyzed on the user interface 45. The processor 43 can be configured to store the response of the wideband RF receiver 42 to the at least two RF signals in the memory 44, e.g. for further analysis or use in applications like equalization.

The processor 43 can be configured to process the receiver 42 acquisitions and perform calculations such as FFT operations to determine the continuous amplitude response and a continuous phase response of the wideband RF receiver 42.

The processor 43, the memory 44 and the user interface 45 can be integrated in a computation unit or a control unit of the system 40. The computation/control unit can contain knowledge of the modulation used in the narrowband RF source 41, e.g. I/Q samples or description of modulation waveform, can control the narrowband RF source 41 to set a desired center frequency, can control the wideband RF receiver to capture I/Q samples at a desired center frequency and bandwidth, and can store recorded waveforms for further processing.

For example, the computation/control unit can receive a user input (via the user interface 45) as to the desired frequency response range to be characterized. For example, the user can input a start and stop frequency. The computation/control unit can then calculate (by means of the processor 43) a set of sub-band (narrowband) measurements to be performed to characterize the wideband RF receiver 42 over its entire usable frequency range with a lower modulation bandwidth on the narrowband RF source 41. Therefore, the narrowband RF source may generate a set of RF signals with overlapping center frequencies and bandwidths which are forwarded to the wideband RF receiver 42. The processor 43 can automate a set of acquisitions for each sub-band measurement by sequentially setting the center frequency and bandwidth of the narrowband RF source 41 and store each signal acquisition by the wideband RF receiver 42 in the memory 44 for later processing.

In particular, the signal source and receiver parameterization may be different, e.g. if like in FIG. 4 the full frequency range is covered by the receiver (wideband RF DUT 42) but not the source (narrowband RF source 41), then only a single center frequency and bandwidth is needed by the receiver while multiple center frequencies with lower bandwidth (sub-bands) are measured for the signal source The system 40 may further comprise a display for visualization of the different amplitude and phase responses (baseband source, baseband receiver, RF path). The display can, for example, be formed by the user interface 45, which can be a touch display.

Figure 5:
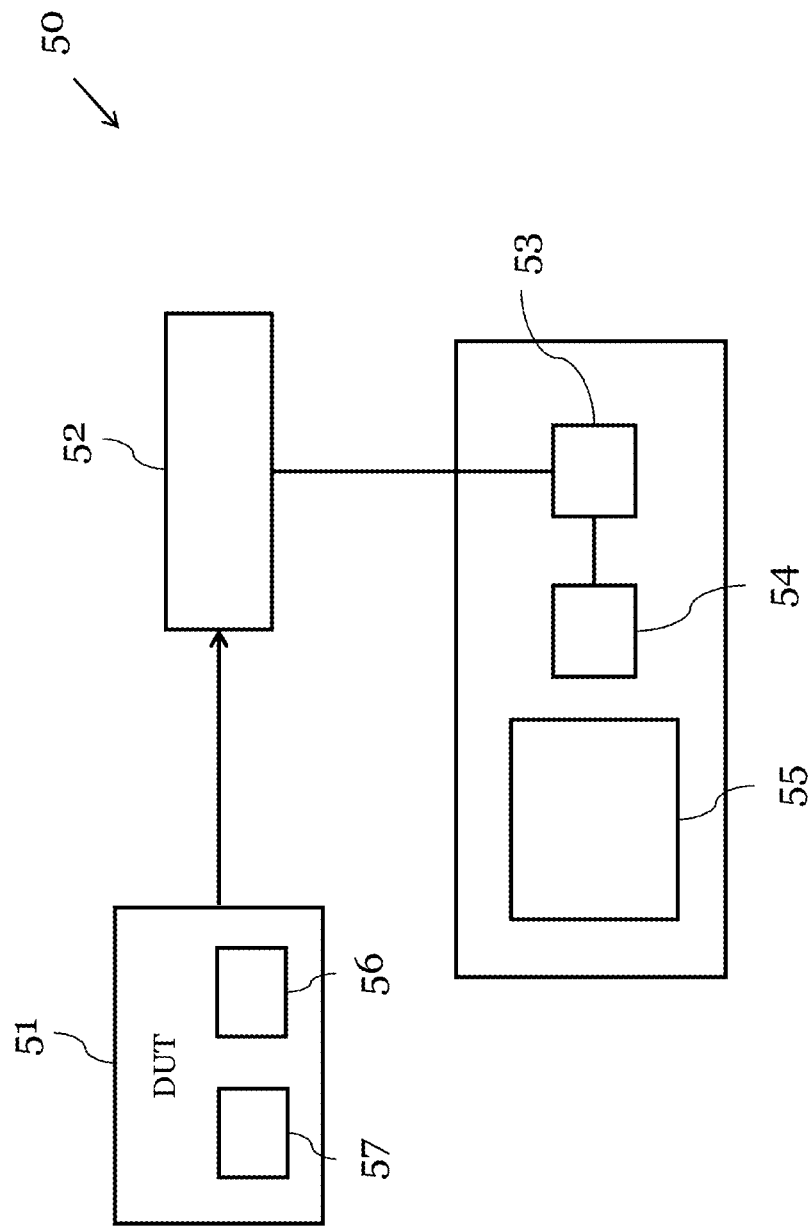
FIG. 5 shows a schematic diagram of a system for characterizing a wideband RF source according to an embodiment.

FIG. 5 shows a schematic diagram of a system 50 for characterizing a wideband RF source 51 according to an embodiment.

The system 50 comprises a narrowband RF receiver 52 having a lower bandwidth than the wideband RF source 51, wherein the narrowband RF receiver 52 is configured to acquire at least two signal-sections of an RF signal produced by the wideband RF source 51, wherein the at least two signal-sections of the RF signal have partially overlapping bandwidths within the bandwidth of the RF signal. The system 50 further comprises a processor 53 which is configured to analyze a response of the narrowband RF receiver 52 to the at least two signal-sections of the RF signal. The processor 53 is further configured to calculate a continuous amplitude response and a continuous phase response of the wideband RF source 51 in a frequency range that corresponds to the combined bandwidths of the at least two signal-sections of the RF signal, wherein said calculation making use of the overlap of the bandwidths of the at least two signal-sections of the RF signal.

In particular, the wideband RF source 51 can be a DUT which is characterized by the system 50. Based on this characterization, the wideband RF source 51 can be calibrated. For example, an equalization of the wideband RF source 51 can be carried out based on the calculated continuous amplitude response and continuous phase, e.g. via calculation of an inverse frequency response and filtering operation.

The wideband RF source 51 may comprise an equalizer filter 56 and/or a predistortion filter 57. These filters 56, 57 can be adjusted based on the calculated continuous amplitude response and continuous phase response of the wideband RF source 51, for instance during such a calibration of the source 51.

The narrowband RF receiver 52 can have I/Q de-modulation capabilities at desired center frequencies within the frequency range to be characterized.

The system 50 can further comprise a user interface 55 and/or a memory 54. A user can, for example, select the bandwidth of the wideband RF source 51 to be analyzed on the user interface 55. The processor 53 can be configured to store the response of the narrowband RF receiver 52 to the at least two RF signals-sections in the memory 54, e.g. for further analysis or use in applications like equalization.

The processor 53 can be configured to process the receiver 52 acquisitions and perform calculations such as FFT operations to determine the continuous amplitude response and a continuous phase response of the wideband RF source 51.

The processor 53, the memory 54 and the user interface 55 can be integrated in a computation unit or a control unit of the system 50. The computation/control unit can contain knowledge of the modulation used in the wideband RF source 51, e.g. I/Q samples or description of modulation waveform, can control the wideband RF source 51 to set a desired bandwidth, can control the narrowband RF receiver 52 to capture I/Q samples at desired center frequencies and bandwidths, and can store recorded waveforms for further processing.

For example, the computation/control unit can receive a user input (via the user interface 55) as to the desired frequency response range to be characterized. E.g., the user can input a start and stop frequency. The computation/control unit can then calculate (by means of the processor 53) a set of sub-band (narrowband) measurements to be performed to characterize the wideband RF source 51 over its entire usable frequency range with a lower modulation bandwidth on the narrowband RF receiver 52. Thereby, the narrowband RF receiver 52 may receive a set of RF signal-sections with overlapping center frequencies and bandwidths. The processor 53 can automate a set of acquisitions for each sub-band measurement by sequentially setting the center frequency and bandwidth of the narrowband RF receiver 52 and store each signal acquisition in the memory 54 for later processing.

The system 50 may further comprise a display for visualization of the different amplitude and phase responses (baseband source, baseband receiver, RF path). The display can, for example, be formed by the user interface 55, which can be a touch display.

The systems 40, 50 shown in FIGS. 4 and 5 can be configured to carry out the method 10 according to any one of FIGS. 1 to 3, wherein the wideband RF DUT in the method 10 corresponds to the wideband RF receiver 42 respectively the wideband RF source 51 in these systems 40, 50.

Figure 6A:
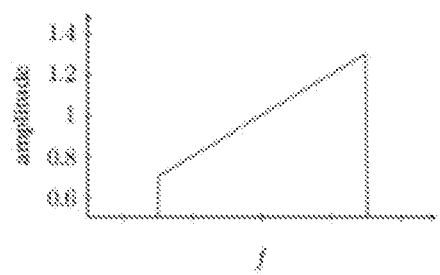
FIGS. 6a-c show a distortion of a measured signal due to an amplitude transfer function of an RF receiver according to an embodiment.
Figure 6B:
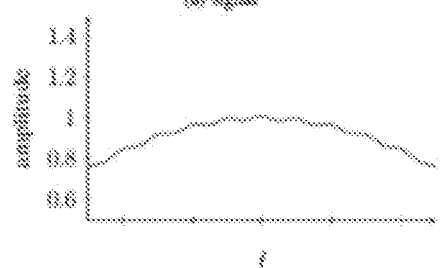
Figure 6C:
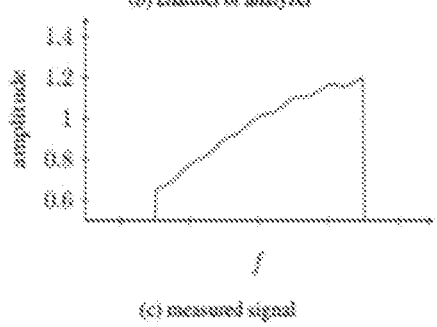

FIGS. 6*a-c* show a distortion of a measured signal due to an amplitude transfer function of an RF receiver, such as the wideband RF receiver 42 shown in FIG. 4, according to an embodiment.

FIG. 6*a* shows the amplitude spectrum of an undistorted RF signal that can be received by an RF receiver, e.g. a spectrum analyzer, and FIG. 6*b* shows an example of an amplitude transfer function of the RF receiver. As shown in FIG. 6*c* the resulting measured signal spectrum includes the distortions of the receiver that can be removed if the analyzer transfer function is known. For example, the system 40 shown in FIG. 4 can be used to determine the amplitude and phase transfer function of an RF receiver, in particular a wideband RF receiver. By calculating these transfer functions, e.g. via the method 10 according to FIGS. 1 to 3, the distortion can be removed from a measured signal.

Figure 7:
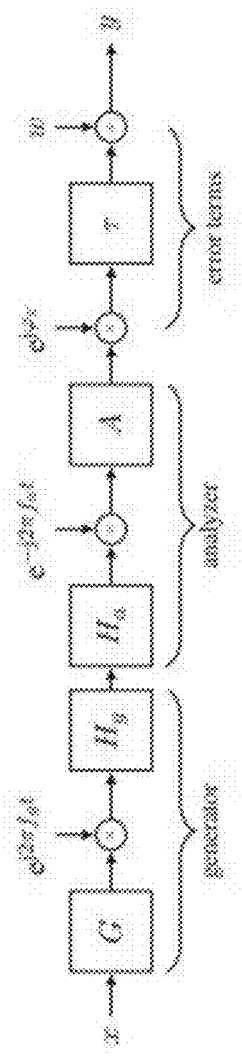
FIG. 7 shows a model for modelling a phase offset between an RF source and an RF receiver according to an embodiment.

FIG. 7 shows a model for modelling a phase offset between an RF source and an RF receiver according to an embodiment. In particular, the model shown in FIG. 7 models a phase offset between a local oscillator of the spectrum analyzer (RF receiver) and the signal generator (RF source). This model emphasizes the importance of exploiting the bandwidth overlap to calculate the continuous amplitude and phase response.

The model shown in FIG. 7 consists of three parts: a generator part, an analyzer part and error terms. The input of the model is a calibration signal x. This baseband signal is filtered by a baseband filter of a generator G and mixed to a generator center frequency $f_g$. At this frequency, the signal is influenced by an RF channel of a generator $H_g$ and an analyzer Ha. Subsequently, the RF signal is mixed down with an analyzer center frequency $f_a$. Thereby, it is influenced by an analyzer baseband frequency response A. The errors that are considered in the model are added at the end of the signal chain. First a random phase $\varphi_\epsilon$ is added, which models a phase offset between the local oscillator of the analyzer and the generator. This phase offset varies for each measurement. Due to the fact that the analyzer determines its starting time of the measurement from a trigger signal with some uncertainty, a delay $\tau$ has to be considered. It is assumed that the delay is zero mean Gaussian distributed. Combining these two errors, a linear error is added to the phase response of the signal. The last distortion that is added to get the output signal y is an additive Gaussian noise term w.

Figure 8:
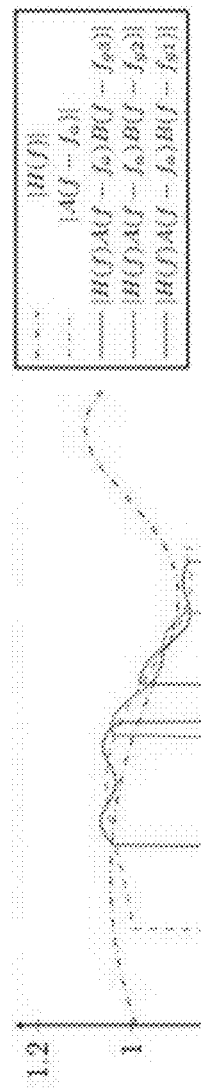
FIG. 8 shows a chart that illustrates RF spectra of different sub-band measurements that are calculated based on the model shown in FIG. 7 according to an embodiment.

FIG. 8 shows a chart that illustrates RF spectra of different sub-band measurements that are calculated based on the model shown in FIG. 7 according to an embodiment. In FIG. 8, H(f) is a joint channel RF response, B(f) is a spectrum of the baseband signal before the mixer of the generator, and A(f) is a transfer function of the analyzer part. The different sub-bands are measured with a constant analyzer center frequency.

Hence, the model according to FIGS. 7 and 8 shows that when performing several subsequent measurements over different frequency ranges, each measurement will have a different phase offset, making it difficult to combine the measurement results. However, by using the method shown in FIGS. 1 to 3 or any one of the systems 40, 50 shown in FIG. 4 or 5, this effect of different phase offsets can be mitigated. The method 10 and the systems 40, 50 exploit a bandwidth overlap of separate measurements to remove the phase offsets and calculate a continuous phase response and amplitude response of a wideband RF source or receiver.

All features of all embodiments described, shown and/or claimed herein can be combined with each other.

The invention claimed is:

1. A method for characterizing a wideband RF device-under-test (DUT) by means of a narrowband RF source or a narrowband RF receiver, the method comprising:
    selecting a bandwidth of the wideband RF DUT to be analyzed;
    dividing the selected bandwidth into at least two overlapping sub-bands, the respective sub-bands having a frequency range that corresponds to a bandwidth of the narrowband RF source or the narrowband RF receiver;
    acquiring a response of the wideband RF DUT for each of the at least two overlapping sub-bands by means of at least two narrowband measurements using the narrowband RF source or the narrowband RF receiver; and
    calculating a continuous amplitude response and a continuous phase response of the wideband RF DUT in a frequency range that corresponds to the combined bandwidth of the at least two overlapping sub-bands, said calculation making use of the overlap of the sub-bands.

2. The method according to claim 1,
    wherein the at least two narrowband measurements using the narrowband RF source or the narrowband RF receiver comprise:
    forwarding at least two RF signals from the narrowband RF source to the wideband RF DUT; or
    acquiring at least two signal-sections of an RF signal produced by the wideband RF DUT by means of the narrowband RF receiver.

3. The method according to claim 1,
    wherein the wideband RF DUT is any one of: a wideband RF receiver, a wideband RF transmitter, a wideband RF transceiver, or a wideband RF source.

4. The method according to claim 1,
    wherein the response of the wideband RF DUT for each of the at least two overlapping sub-bands is acquired subsequently and stored in a memory.

5. The method according to claim 1,
    wherein, when calculating the continuous amplitude response and the continuous phase response of the wideband RF DUT, contributions from at least two of an RF source baseband, an RF receiver baseband, or a common RF path are neglected.

6. The method according to claim 1, further comprising:
    determining a statistical deviation of the continuous amplitude response and/or the continuous phase response.

7. The method according to claim 1,
    wherein the calculation of the continuous amplitude response and the continuous phase response of the wideband RF DUT comprises an FFT (fast Fourier transform) operation.

8. The method according to claim 1, further comprising:
    calibrating the wideband RF DUT based on the calculated continuous amplitude response and/or the calculated continuous phase response.

9. The method according to claim 1,
    wherein the step of calibrating the wideband RF DUT comprises adjusting an equalizer and/or a predistortion filter based on the calculated continuous amplitude response and/or the calculated continuous phase response.

10. A system for characterizing a wideband RF receiver, comprising:
    a narrowband RF source having a lower bandwidth than the wideband RF receiver;
    the narrowband RF source being configured to forward at least two RF signals to the wideband RF receiver, the at least two RF signals having partially overlapping bandwidths within the bandwidth of the wideband RF receiver; and
    a processor being configured to analyze a response of the wideband RF receiver to the at least two RF signals;
    the processor being configured to calculate a continuous amplitude response and a continuous phase response of the wideband RF receiver in a frequency range that corresponds to the combined bandwidths of the at least to RF signals, said calculation making use of the overlap of the bandwidths of the at least two RF signals.

11. The system according to claim 10, further comprising:
a user interface for selecting the bandwidth of the wideband RF receiver to be analyzed.

12. The system according to claim 10, further comprising:
a memory,
wherein the processor is configured to store the response of the wideband RF receiver to the at least two RF signals in the memory.

13. A system for characterizing a wideband RF source, comprising:
a narrowband RF receiver having a lower bandwidth than the wideband RF source;
the narrowband RF receiver being configured to acquire at least two signal-sections of an RF signal produced by the wideband RF source, the at least two signal-sections of the RF signal having partially overlapping bandwidths within the bandwidth of the RF signal; and
a processor being configured to analyze a response of the narrowband RF receiver to the at least two signal-sections of the RF signal;
the processor being configured to calculate a continuous amplitude response and a continuous phase response of the wideband RF source in a frequency range that corresponds to the combined bandwidths of the at least two signal-sections of the RF signal, said calculation making use of the overlap of the bandwidths of the at least two signal-sections of the RF signal.

14. The system according to claim 13, further comprising:
a user interface for selecting the bandwidth of the wideband RF source to be analyzed.

15. The system according to claim 13, further comprising:
a memory,
wherein the processor is configured to store the response of the narrowband RF receiver to the at least two signal-sections of the RF signal in the memory.

* * * * *